(12) United States Patent
Rossi (10) Patent No.: US 12,078,280 B2
(45) Date of Patent: Sep. 3, 2024

(54) CONDUIT EXPLORATION ROBOT COMPRISING A POSITIONING SYSTEM

(71) Applicant: AUTONOMOUS CLEAN WATER APPLIANCE (ACWA) ROBOTICS, Petreto-Bicchisano (FR)

(72) Inventor: Jean-François Rossi, Ville di Pietrabugno (FR)

(73) Assignee: AUTONOMOUS CLEAN WATER APPLIANCE (ACWA) ROBOTICS, Petreto-Bicchisano (FR)

( * ) Notice: Subject to any disclaimer, the term of this patent is extended or adjusted under 35 U.S.C. 154(b) by 273 days.

(21) Appl. No.: 17/639,157

(22) PCT Filed: Sep. 10, 2020

(86) PCT No.: PCT/EP2020/075400
§ 371 (c)(1),
(2) Date: Feb. 28, 2022

(87) PCT Pub. No.: WO2021/052868
PCT Pub. Date: Mar. 25, 2021

(65) Prior Publication Data
US 2022/0325843 A1    Oct. 13, 2022

(30) Foreign Application Priority Data

Sep. 16, 2019  (FR) ........................ 1910181

(51) Int. Cl.
*F16L 55/34* (2006.01)
*F16L 101/30* (2006.01)

(52) U.S. Cl.
CPC ........... *F16L 55/34* (2013.01); *F16L 2101/30* (2013.01)

(58) Field of Classification Search
CPC . F16L 55/44; F16L 55/40; F16L 55/32; F16L 55/34; F16L 2101/30; F16L 55/28; F16L 55/26
See application file for complete search history.

(56) References Cited

U.S. PATENT DOCUMENTS

| 5,018,451 A * | 5/1991 | Hapstack ................ F16L 55/34 104/138.2 |
| 6,450,104 B1 | 9/2002 | Grant et al. |
| 2012/0215348 A1 | 8/2012 | Skrinde |

FOREIGN PATENT DOCUMENTS

| CN | 204986220 U | 1/2016 |
| CN | 107191740 A | 9/2017 |

(Continued)

OTHER PUBLICATIONS

"Positioning Accuracy of a Pipeline Surveying System Based on MEMS IMU and Odometer: Case Study"; Jul. 2019; Qijin Chen, Quan Zhang, Xiaoji Niu and Yi Wang (Year: 2019).*

(Continued)

*Primary Examiner* — Peter J Macchiarolo
*Assistant Examiner* — Anthony W Megna Fuentes
(74) *Attorney, Agent, or Firm* — HAUPTMAN HAM, LLP (57) ABSTRACT

A robot includes a first frame and a second frame. The first frame and the second frame each include a bearing module for bearing against a wall of a conduit, and at least one positioning system for the relative positioning of the first frame and the second frame, the robot where the positioning system includes at least a first pair of linear actuators disposed in a direction parallel to a longitudinal axis x of the robot, able to be independently actuated such that they move in translation, and free to rotate relative to at least one of (Continued)

either the first frame or the second frame, so as to position the first frame and the second frame relative to one another.

15 Claims, 4 Drawing Sheets

(56) References Cited

FOREIGN PATENT DOCUMENTS

| | | |
|---|---|---|
| CN | 207005570 U | 2/2018 |
| DE | 102015106333 A1 | 10/2016 |
| EP | 2691684 B1 | 5/2016 |
| WO | 2012112835 A1 | 8/2012 |
| WO | 2017197418 A1 | 11/2017 |
| WO | 2018064159 A1 | 4/2018 |

OTHER PUBLICATIONS

International Search Report issued in corresponding International Application No. PCT/EP2020/075400, dated Nov. 5, 2020, pp. 1-2, European Patent Office, Rijswijk, Netherlands.

Written Opinion issued in corresponding International Application No. PCT/EP2020/075400, dated Nov. 5, 2020, pp. 1-5, European Patent Office, Munich, Germany.

\* cited by examiner

CONDUIT EXPLORATION ROBOT COMPRISING A POSITIONING SYSTEM

The present application is a U.S. National Phase of International Application Number PCT/EP2020/075400, filed Sep. 10, 2020, which claims priority to French Application No. 1910181, filed Sep. 16, 2019.

TECHNICAL FIELD

The present invention relates to the field of conduit-exploring robots. One particularly advantageous application lies in the field of conduit-exploring robots moving in steps.

PRIOR ART

Water supply networks are made up of mostly buried pipes, formed by assembling cylindrical sections. Water supply networks constitute large-scale infrastructures. For example, for a country such as France, these networks when combined cover close to one million linear kilometres. Globally, it is estimated that there are 30 million linear kilometres of such networks, which are growing every day.

These networks are very complex. They comprise numerous components including catchment and treatment units, reservoirs and impoundments, lift units, gridding and interconnections, as well as pipes and connections.

Among these components, pipes make up, in linear terms, the majority of the water supply networks. These pipes are very heterogeneous. More specifically, in the same region, sections of new networks can exist alongside others that are from up to a year to as much as two centuries old. This can lead to significant differences between pipes, in particular in terms of constituent materials, laying techniques, renewal frequencies and maintenance procedures.

Moreover, the conditions under which these pipes are used can be harsh. The internal pressure thereof is usually comprised between 3 and 20 bar, and the current water flow velocity can reach up to 2 or even 4 m/s.

The pipes are thus susceptible to degradation. There are many causes of degradation, in particular including external impacts, for example resulting from construction works or vehicle traffic, impacts related to the operation of the water network, for example during shut-off and re-open phases and in the event of significant pressure variations, internal abrasion caused by the presence of minerals in the water conveyed, corrosion and root intrusions.

This degradation leads to recurrent problems in the supply of potable water. In particular, it is estimated that 20-40% of the water conveyed between the point of abstraction and the point of delivery is lost. In order to increase the efficiency of these pipes, they must be able to undergo inspection so as to detect any degradation in order to carry out repairs.

However, the documentation available on these pipes is generally insufficient, in particular in rural areas. It is thus also necessary to map them, in order to carry out maintenance thereon.

However, the network must operate continuously. All operations that make the pipes unavailable must be scheduled and limited in time and frequency. The human interventions required to map and inspect these pipes, which will disrupt the operation of the water supply network, are thus difficult to implement.

One solution involves travelling through the inside of these pipes. Conduit-exploring robots are used to do this. These robots are thus designed to explore conduits, such as pipes in water supply networks, in order to collect information to map them or even inspect them for possible degradation. Moreover, this exploration can be carried out without cutting off supply from the network. These robots are thus intended to be exposed to the conditions of use of the pipes. They can in particular be placed under pressure and have to move with or against the flow of water, in more or less winding pipes. The method of displacement of these robots must thus preferably be adapted to these conditions and they must be able to orient themselves in pipes of unknown architecture.

In particular, an at least partially orientable robot for advancing through winding conduits is known from the document WO 2012/112835 A1. For this purpose, the robot comprises two frames connected by an articulated joint, allowing the robot to advance around bends in the conduits.

This articulated joint comprises a plurality of portions, the rotation whereof about a longitudinal axis of the robot allows the angular configuration of the articulated joint to be changed and thus a part of the robot to be oriented. This rotation can also be actuated by the robot in order to facilitate exploration of the pipes. The robot is capable of moving in translation along the axis longitudinal to the conduit by means of track wheels or propellers.

However, the orientation of at least part of the robot by this articulated joint remains complex and can take a long time to adjust. Moreover, the translation of the robot by a rolling system can be difficult to implement with the water flow velocity and the unfavourable adhesion conditions of the conduit walls.

Document WO 2017/197418 A1 describes a robot for advancing inside a tube, comprising a plurality of frames, and a positioning system between two consecutive frames. The positioning system comprises a plurality of linear actuators forming a hexapod. This positioning system remains complex and the effectiveness thereof in causing the robot to advance through the conduit is limited.

Document DE 10 2015 106333 A1 describes a robot capable of advancing through pipes. For this purpose, the robot comprises a positioning system comprising independently expandable and compressible bellows. This positioning system is difficult to implement and offers limited mobility.

One purpose of the present invention is thus to improve the overall mobility of a conduit-exploring robot. More particularly, one non-limiting objective is to improve the mobility between two frames of the robot, in particular in order to explore more or less windy conduits.

Other purposes, features and advantages of the present invention will appear upon reading the following description and the accompanying drawings. It is understood that other advantages can be incorporated therein.

SUMMARY

In order to achieve this objective, according to one embodiment, the invention provides a conduit-exploring robot comprising:
- a first frame and a second frame;
- the first frame and the second frame each comprising a bearing module, the bearing module being provided with a bearing portion that can be applied against a wall of the conduit, each bearing module being configured to move alternately from a bearing portion engaged configuration to a bearing portion disengaged configuration;

at least one system for the relative positioning of the first frame and the second frame, the positioning system connecting the first frame and the second frame.

The robot is characterised in that the positioning system comprises at least a first pair of linear actuators, which are disposed in a direction parallel to a longitudinal axis of the robot, said axis passing through a centre of the first frame and a centre of the second frame, when the first frame and the second frame are aligned, able to be independently actuated so that to move in translation along the longitudinal axis of each linear actuator of the first pair, and configured to be free to rotate, through at least one angular sector, relative to at least one of either the first frame or the second frame, about an axis perpendicular to the longitudinal axis of the robot, so as to position the first frame and the second frame relative to one another.

Thus, a relative translational displacement of the first pair of linear actuators allows both the relative translation and orientation of the first frame and of the second frame. One of either the first frame or the second frame can move in translation and be oriented relative to the other of either the first frame or the second frame in a space bounded by the extendibility of at least one linear actuator of the first pair, and by the at least one angular sector of rotational freedom of the at least one actuator. One of either the first frame or the second frame can thus be precisely placed at a point in the conduit, for example for the robot to advance through a winding conduit. The mobility between the first frame and the second frame is thus improved.

Moreover, the translation and orientation of this frame can be adapted to the degree of winding of the conduit. When the conduit is not very winding, the first pair of linear actuators can be deployed over a large distance relative to the extendibility thereof, allowing the conduit to be explored by the robot quickly. The relative translational displacement of the linear actuators of the first pair can be carried out over a small distance relative to the extendibility thereof, allowing this frame to be precisely oriented and winding conduits to be explored. The displacement of the robot can thus be adapted to the conduit, which can allow for efficient exploration of the pipes.

BRIEF DESCRIPTION OF THE FIGURES

The aims, purposes, features and advantages of the invention will be better understood upon reading the detailed description given of one embodiment thereof, which is illustrated by means of the following accompanying drawings.

The drawings are provided by way of example and are not intended to limit the scope of the invention. They constitute diagrammatic views intended to ease the understanding of the invention and are not necessarily to the scale of practical applications.

DETAILED DESCRIPTION

Before giving a detailed review of embodiments of the invention, optional features are set out below, which can be used in combination with or in replacement of one another.

According to one example, the positioning system can be configured at least so as to position one of either the first frame or the second frame, one of either the first frame or the second frame being in the bearing portion disengaged configuration, relative to the other of either the first frame or the second frame, the other of either the first frame or the second frame being in the bearing portion engaged configuration. Thus, depending on which of the first frame or the second frame is in the bearing portion engaged configuration, the translation and orientation of the frame into the disengaged configuration can be carried out such that the robot is capable of moving in the direction longitudinal to the conduit, either forwards or backwards. This thus improves the mobility of the robot, and makes it easier to explore a network of conduits, in particular when the architecture thereof is unknown.

According to one example, each linear actuator of said first pair can be free to rotate, through at least one angular sector, relative to the first frame and to the second frame, in at least one direction perpendicular to the longitudinal axis of the robot. Thus, the angular sector of rotational freedom of each actuator of the first pair can be increased. The space in which one of either the first frame or the second frame can be moved in translation and oriented can thus be increased, thus improving mobility between the first frame and the second frame of the robot.

According to one example, each linear actuator of the first pair can comprise at least one articulated joint comprising at least one pivot link about an axis perpendicular to the longitudinal axis of the robot, so as to allow each linear actuator of the first pair to rotate, through at least one angular sector, about the axis perpendicular to the longitudinal axis of the robot, relative to at least one of either the first frame or the second frame, or relative to the first frame and the second frame.

According to one example, at least one of either the first frame or the second frame can comprise a base plate, the first pair of actuators being connected to at least one of either the first frame or the second frame via the base plate. Preferably, each of the first frame and the second frame comprise a base plate, the first pair of actuators being connected to at least one of either the first frame or the second frame via the base plate.

According to one example, the base plate can be configured to be capable of moving via a rotational motion about an axis parallel to the longitudinal axis of the robot, through at least one angular range. Thus, the positioning system can be driven in rotation about the longitudinal axis of the robot through this angular range. The rotational motion of the base plate can more particularly be actuated by a motor. Furthermore, the angular range is preferably comprised between 30° and 120°, more preferably the angular range is substantially equal to 90°.

According to one example, the positioning system can comprise a second pair of linear actuators, disposed in a direction parallel to the longitudinal axis of the robot, able to be independently actuated so that to move in translation along the longitudinal axis of each linear actuator of the second pair. The linear actuators of the second pair can be configured to be free to rotate, through at least one angular sector, relative to at least one of either the first frame or the second frame, about an axis perpendicular to the longitudinal axis of the robot.

Moreover, each linear actuator of the second pair can comprise at least one articulated joint comprising at least one pivot link about an axis perpendicular to the longitudinal axis of the robot, so as to allow each linear actuator of the second pair to rotate, through at least one angular sector, about the axis perpendicular to the longitudinal axis of the robot, relative to at least one of either the first frame or the second frame, or relative to the first frame and the second frame.

According to one example, the first pair of linear actuators is disposed in a first plane and the second pair of linear actuators is disposed in a second plane, the first plane being different from the second plane.

The use of two pairs of linear actuators disposed in two different planes allows the first frame and the second frame to be moved in translation and oriented relative to one another in a three-dimensional space, bounded by the extendibility of at least one linear actuator of each pair, and by at least one angular sector of rotational freedom of the at least one actuator of each pair, relative to at least one of either the first frame or the second frame. More particularly, one of either the first frame or the second frame can be moved in translation and oriented in a cone with an ellipsoidal cross-section, with the generator parallel to the longitudinal axis of the robot and the apex being a point at the intersection between the first plane and the second plane.

According to this example, the first plane and the second plane can more particularly be perpendicular. Thus, one of either the first frame or the second frame can be moved in translation and oriented in a cone with a circular cross-section. The space into which one of either the first frame or the second frame can be moved in translation and oriented is thus maximised in all directions perpendicular to the longitudinal axis of the robot.

According to one example, the positioning system can further comprise an intermediate mounting, the first pair of linear actuators being mounted on the first frame via a first portion, the second pair of linear actuators being mounted on the second frame via a first portion, the first pair and the second pair of linear actuators each being capable of being mounted on the intermediate mounting via a second portion. The first pair and the second pair of linear actuators can be mounted on the intermediate mounting such that the first pair and the second pair of linear actuators are disposed on either side of the intermediate mounting in a direction parallel to the longitudinal axis of the robot. The use of an intermediate mounting between the first pair and the second pair of linear actuators makes it possible to exploit, at least in part, the extendibility of at least one linear actuator of each pair, in order to increase the space in which one of either the first frame or the second frame can be moved in translation and oriented, in a direction parallel to the longitudinal axis of the robot.

Preferably, the first pair of linear actuators can be mounted on the first frame via a first end. Moreover, the second pair of linear actuators can be mounted on the second frame via a first end. The first pair and the second pair of linear actuators can each be mounted on the intermediate mounting via a second end.

According to one example, the mounting can comprise a first base and a second base, the first pair of linear actuators being mounted on the first base and the second pair of linear actuators being mounted on the second base. The mounting can further be configured such that the length of the positioning system along the longitudinal axis of the robot is shorter than the sum of the lengths of at least one actuator of the first pair and of at least one actuator of the second pair. In this way, the volume of the positioning system, along the longitudinal axis of the robot, can be reduced, while at the same time making it possible to exploit, at least in part, the extendibility of at least one linear actuator of each pair.

According to one example, at least one of either the first pair or the second pair of linear actuators can be mounted on the intermediate mounting, so as to be free to rotate through at least one angular sector relative to the intermediate mounting, about an axis perpendicular to the longitudinal axis of the robot.

More particularly, each actuator of at least one of either the first pair or the second pair can be mounted on the intermediate mounting by an articulated joint, this articulated joint comprising at least one pivot link along an axis perpendicular to the longitudinal axis of the robot. This articulation thus allows for a rotational motion through at least one angular sector, of each actuator of at least one of either the first pair or the second pair, relative to the intermediate mounting, about the axis perpendicular to the longitudinal axis of the robot.

According to one example, the mounting can be configured such that at least one of either the first pair or the second pair of linear actuators is free to rotate, through the at least one angular sector, relative to the intermediate mounting. The robot according to this specific embodiment increases the space into which one of either the first frame or the second frame can be moved in translation and oriented, in a direction perpendicular to the longitudinal axis of the robot. A gain in flexibility of the positioning system can thus be procured, facilitating the exploration of winding conduits by the robot.

Preferably, the mounting can be configured such that the first pair and the second pair of linear actuators are free to rotate, through at least one angular sector, relative to the intermediate mounting, about an axis perpendicular to the longitudinal axis of the robot.

More particularly, the mounting can comprise a plurality of apertures configured so as to allow for the passage of each linear actuator of at least one of either the first pair or the second pair, during a rotational motion, through the at least one angular sector, relative to the intermediate mounting, about the axis perpendicular to the longitudinal axis of the robot.

According to one example, the robot can further comprise a measuring device suitable for measuring the orientation of the conduit.

According to one example, the robot can further comprise a controller configured to independently actuate each linear actuator of the at least one first pair. The controller can further be configured to control independent actuation of each linear actuator of the second pair.

Thus, at least one of either the first frame or the second frame can be moved in translation and oriented autonomously by the robot.

It is specified that within the scope of the present invention, the term "bearing portion" refers to a portion of the robot, and more particularly of a bearing module, intended to bear against the wall of a conduit.

The term "able to be independently actuated so that to move in translation" is understood to mean that the linear actuators of the first pair or of the second pair are each capable of being actuated such that they move in translation in an independent manner, i.e. the actuation of one linear actuator such that it moves in translation does not necessarily imply the actuation of another linear actuator of the same or of the other pair such that it also moves in translation.

The longitudinal axis x of the robot corresponds to an axis passing through the centres of the first frame and of the second frame, when the first frame and the second frame are aligned. When the first frame and the second frame are not aligned, the longitudinal axis of the robot can be divided into two longitudinal axes x and x', the longitudinal axis x being the longitudinal axis of the first frame and the longitudinal axis x' being the longitudinal axis of the second frame.

When an axis is "parallel" to another axis or to a direction, that axis can be parallel to, or coincident with, the other axis or the direction considered.

A parameter that is "substantially equal to/greater than/less than" a given value is understood to mean that this parameter is equal to/greater than/less than the given value, to within plus or minus 10%, or even to within plus or minus 5% of this value.

The conduit-exploring robot, according to one example embodiment of the invention, will now be described.

Figure 1:
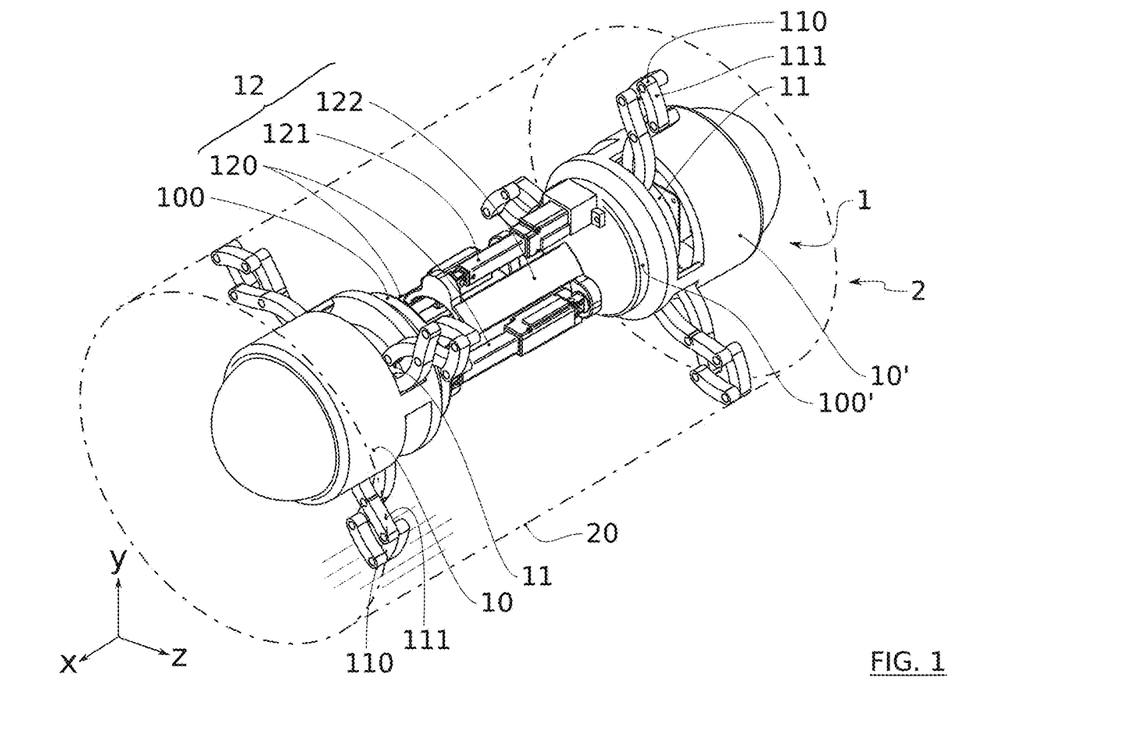
FIG. 1 shows a perspective, assembled view of the conduit-exploring robot according to one embodiment of the invention.
Figure 2:
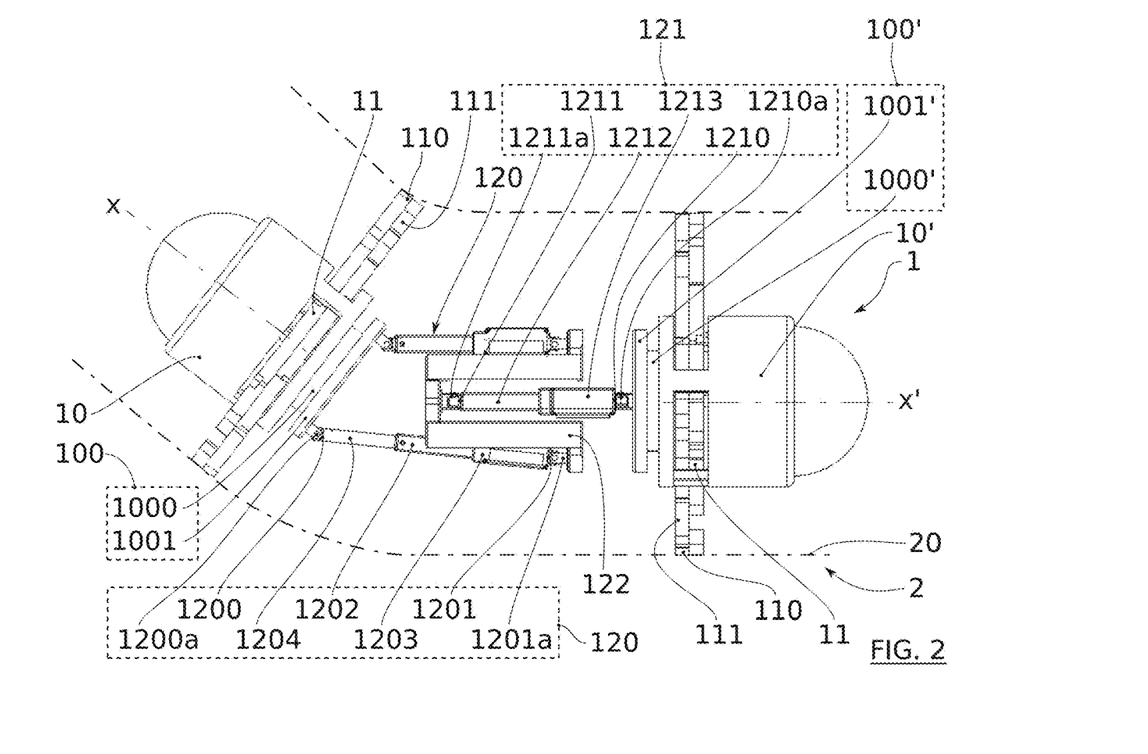
FIG. 2 shows an overhead, assembled view of the robot shown in FIG. 1.

According to this embodiment, and as shown in FIGS. 1 and 2, the robot 1 comprises a first frame 10 and a second frame 10'. The first frame 10 and the second frame 10' comprise a bearing module 11. The bearing module 11 is configured to cause at least one of either the first frame 10 or the second frame 10' to bear against a wall 20 of a conduit 2, via a bearing portion 110 that can be applied against the wall 20. More particularly, the bearing module 11 can be configured to alternately switch between a bearing portion 110 engaged configuration, and a bearing portion 110 disengaged configuration.

The robot 1 further comprises a positioning system 12, connecting the first frame 10 and the second frame 10'. The positioning system is configured to allow for the relative positioning of the first frame 10 and of the second frame 10'.

The robot 1 can be displaced in steps, the kinematics whereof will now be described for a forwards movement of the robot 1, along the longitudinal axis of the conduit 2. According to this embodiment, in order to allow the robot 1 to move forward, the displacement kinematics can be described through two main phases: a deployment phase and a retraction phase.

During the deployment phase, the bearing module 11 of the second frame 10' is in the bearing portion 110 engaged configuration. The second frame 10' is thus fixed relative to the conduit 2. The bearing module 11 of the first frame 10 is furthermore in the bearing portion 110 disengaged configuration. The positioning system 12 can be actuated so as to position the first frame 10 relative to the second frame 10'. For example, the first frame 10 is moved away from the second frame 10' along the longitudinal axis of the conduit 2, which is coincident with the longitudinal axis x of the robot 1 in FIG. 1. When the first frame 10 is positioned in this manner, with the second frame 10' still in the bearing portion 110 engaged configuration, the bearing module 11 of the first frame 10 can be switched into the engaged configuration. The first frame 10 is thus fixed relative to the conduit 2.

During the retraction phase, the module 11 of the second frame 10' can be switched into the disengaged configuration. The positioning system 12 can be actuated so as to position the second frame 10' relative to the first frame 10. For example, the second frame 10' is moved closer to the first frame 10 along the longitudinal axis of the conduit 2. When the second frame 10' is positioned in this manner, with the first frame 10 still in the bearing portion 110 engaged configuration, the bearing module 11 of the second frame 10' can be switched into the engaged configuration. The second frame 10' is thus fixed relative to the conduit 2.

These deployment and retraction phases can follow on from one another to allow the robot to advance. It should be noted that depending on which of the first frame 10 and the second frame 10' is in the disengaged configuration at the start of the movement, the displacement of the robot 1 can be carried out along the longitudinal axis of the robot 1, and more particularly along the longitudinal axis of the conduit, in a forwards or backwards direction. The robot 1 can thus explore a network of conduits, for example it can reverse when it reaches a dead end. The robot 1 can furthermore return to its starting point, for example the point at which the robot 1 was inserted into the conduit 2, in order to be retrieved. Thus, the pipes can be explored even when the number of access points to these pipes is limited.

In the description hereinbelow, the advancement of the robot 1 is described in terms of a forwards displacement. It is understood that the features described are also applicable for a backwards displacement. More particularly, the positioning of the first frame 10 described hereinbelow can be applied to the second frame 10'.

In order for at least one of either the first frame 10 or the second frame 10' to alternately switch from the engaged configuration to the disengaged configuration, the bearing module 11 can be provided with a plurality of articulated arms 111, each articulated arm 111 comprising the bearing portion 110. The bearing portion 110 can furthermore be displaced by a movement of an articulated arm 110. In the engaged configuration, each articulated arm 111 is deployed further than in said disengaged configuration.

As shown in FIG. 2, the positioning system 12 is configured to be able to move in translation and orientate the first frame 10 relative to the second frame 10' such that the first frame 10 is placed at a specific point in the conduit. This makes it possible for the robot to advance through a winding conduit or a branch of a pipe.

For this purpose, the positioning system 12 comprises at least a first pair 120 of linear actuators, and preferably a first pair 120 and a second pair 121 of linear actuators. In the description hereinbelow, unless specified otherwise, the specific embodiment wherein the positioning system 12 comprises a first pair 120 and a second pair 121 of linear actuators is considered.

According to this example, the first pair 120 and the second pair 121 of linear actuators are configured such that a relative displacement of the linear actuators of at least one of either the first pair 120 or the second pair 121 allows for both the relative translation and orientation of the first frame 10 and of the second frame 10'. In particular, the translation and orientation of the first frame 10 allows the first frame 10 to be positioned in a two- or even three-dimensional space.

For this purpose, the first pair 120 and the second pair of actuators can be disposed in a direction parallel to the longitudinal axis (x) of the robot 1. The actuators of the first pair 120, or even of the second pair 121, are also able to be independently actuated such that they move in translation along the longitudinal axis of each linear actuator.

Furthermore, each actuator of the first pair 120 and of the second pair 121 can be configured so as to be free to rotate, through at least one angular sector, relative to the first frame 10 and to the second frame 10', about an axis perpendicular to the longitudinal axis x of the robot 1.

Figure 5:
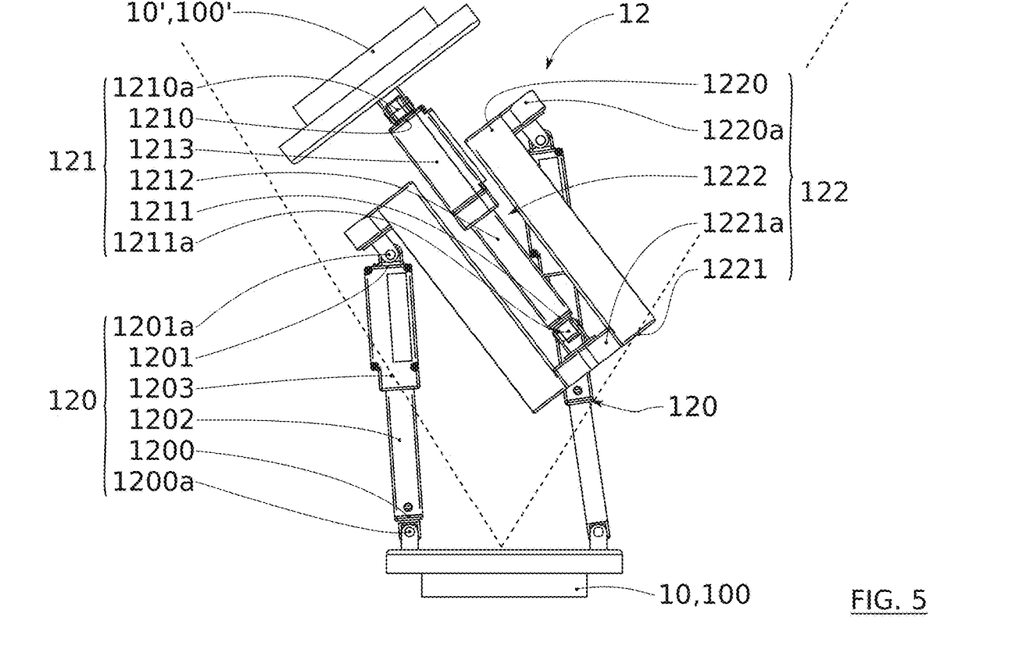
FIG. 5 shows an overhead, assembled view of the part of the robot shown in FIG. 3, in a configuration wherein a first pair of actuators and a second pair of actuators are independently actuated.

Thus, the first frame 10 can be positioned in a space bounded by the extendibility of at least one linear actuator of the first pair 120 and/or of the second pair 130, and by at least the angular sector of rotational freedom of the at least one actuator. This space is, for example, shown via a dotted line in FIG. 5.

Figure 3:
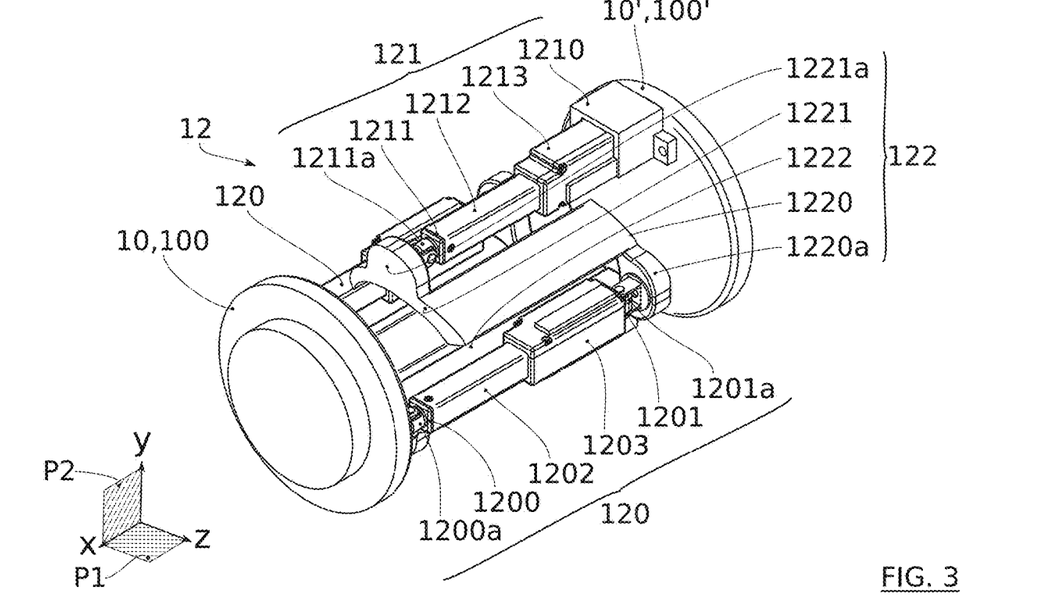
FIG. 3 shows a perspective, assembled view of a part of the robot shown in FIG. 1, comprising the positioning system in a retracted configuration.
Figure 4:
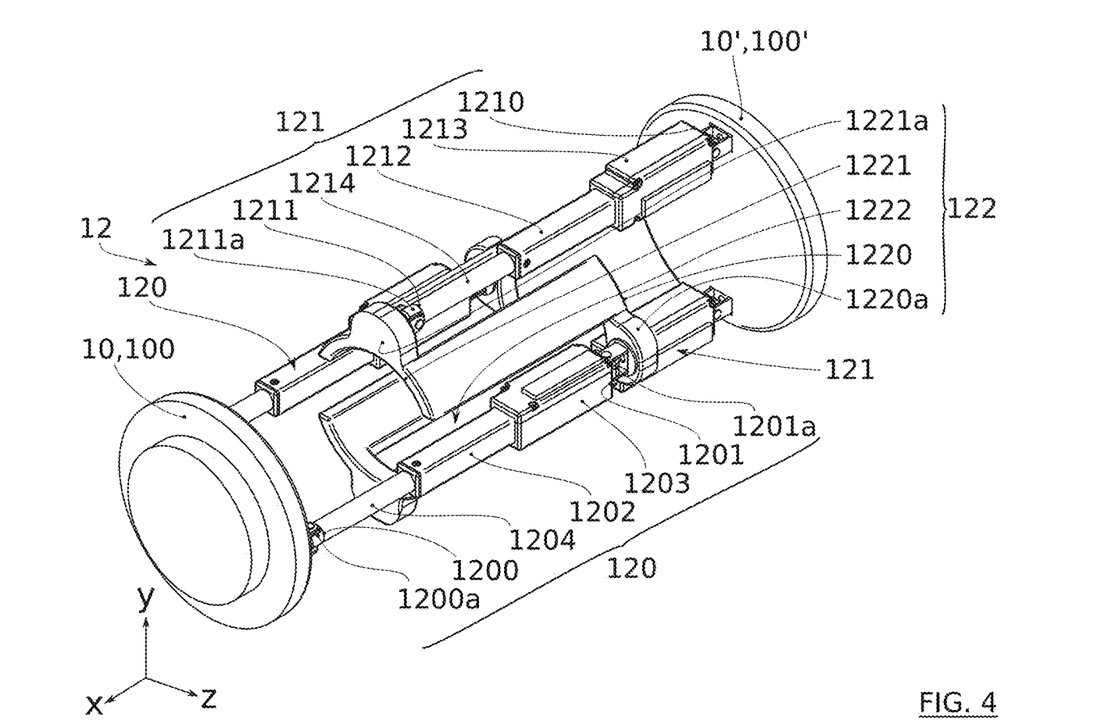
FIG. 4 shows a perspective, assembled view of the part of the robot shown in FIG. 3, in a deployed configuration.

The linear actuators will now be described with reference to FIGS. 3 to 6. Each actuator of the first pair 120 and of the second pair 121 can respectively comprise a body 1202, 1212, a motor block 1203, 1213 and a sliding projection 1204, 1214. The motor block 1203, 1213 can be configured to actuate the deployment or retraction of the sliding projection 1204, 1214 relative to the body 1202, 1212, along the longitudinal axis of the linear actuator, as shown in FIGS. 3 and 4. The linear actuators of the first pair 120 can be of substantially equal length. The linear actuators of the first pair 121 can be of substantially equal length, or of substantially the same length as the first pair 120.

In order for each linear actuator of the first pair 120 to be configured to be free to rotate, through at least one angular sector, relative to the first frame 10, each actuator of the first pair 120 can further comprise at least a first articulated joint 1200a, preferably disposed at a first end 1200 of the linear actuator. In order for each actuator of the first pair 120 to be configured to be free to rotate, through at least one angular sector, relative to the second frame 10', each linear actuator of the first pair 120 can comprise a second articulated joint 1201a, more preferably disposed at a second end 1201 of the linear actuator. The first articulated joint 1200a and the second articulated joint 1201a can be configured to allow for at least one degree of rotational freedom of the linear actuator of the first pair 120 relative to the first frame 10 and to the second frame 10'. For this purpose, the first articulated joint 1200a and the second articulated joint 1201a can comprise a pivot link, for example along an axis y perpendicular to the longitudinal axis x, as shown in FIG. 4.

The first articulated joint 1200a of the first pair 120 of linear actuators can be mounted on the first frame 10, directly or via a base plate 100, described in more detail hereinbelow. The second articulated joint 1201a of the first pair 120 of linear actuators can be mounted on the second frame 10' or mounted on an intermediate mounting 122, described in more detail hereinbelow.

In order for each linear actuator of the second pair 121 to be configured to be free to rotate, through at least one angular sector, relative to the second frame 10', each actuator of the second pair 121 can further comprise at least a first articulated joint 1210a, preferably disposed at a first end 1210 of the linear actuator. In order for each actuator of the second pair 121 to be configured to be free to rotate, through at least one angular sector, relative to the first frame 10, each linear actuator of the second pair 121 can comprise a second articulated joint 1211a, more preferably disposed at a second end 1211 of the linear actuator. The first articulated joint 1210a and the second articulated joint 1211a can be configured to allow for at least one degree of rotational freedom of the linear actuator of the second pair 121 relative to the first frame 10 and to the second frame 10'. For this purpose, the first articulated joint 1210a and the second articulated joint 1211a can comprise a pivot link, for example along an axis z perpendicular to the longitudinal axis x, as shown in FIG. 4.

The first articulated joint 1210a of the second pair 121 of linear actuators can be mounted on the second frame 10', directly or via a base plate 100', described in more detail hereinbelow. The second articulated joint 1211a of the second pair 121 of linear actuators can be mounted on the first frame 10 or mounted on an intermediate mounting 122 described in more detail hereinbelow.

The first articulated joint 1200a, 1210a of the first pair 120 and/or of the second pair 121 of linear actuators can be configured to fit into a housing. In particular, this housing is configured to limit the axial motion of the actuator on which it is mounted, relative to the longitudinal axis x of the robot 1. For this purpose, and as shown in FIG. 3, this housing can more particularly comprise a first wall and a second wall, disposed on either side of the actuator, parallel to the plane P2, and a transverse wall connecting the first wall and the second wall. The transverse wall can thus cause the actuator on which the housing is mounted to abut.

At least one of either the first frame 10 or the second frame 10' can comprise a base plate 100, 100'. Preferably, the first frame 10 and the second frame 10' can each comprise a base plate 100, 100'. Each base plate 100, 100' can be configured such that it can be moved in a rotational motion about an axis parallel to the longitudinal axis x of the robot, or equivalently parallel to the longitudinal axis x, x' of the at least one of either the first frame 10 or the second frame 10'. Each base plate 100, 100' can be configured such that it can move in rotation through at least one angular range. The rotation of each base plate 100, 100' can allow the positioning system 12 to be driven such that it rotates about the longitudinal axis x of the robot. As shown in FIG. 2, as the robot 1 advances around a bend in the conduit 2, at least one of either the first pair 120 or the second pair 121 of actuators can be placed in the main plane of the bend in the conduit, including the longitudinal axes of the conduit 2 on either side of the bend. The angular range of rotation of each base plate is, for example, comprised between 30° and 120°, preferably the angular range is substantially equal to 90°. Preferably, the angular ranges of the base plates 100, 100' of the first frame 10 and of the second frame 10' are equal.

When the first frame 10 and the second frame 10' each comprise a base plate 100, 100', each base plate 100, 100' can be rotated when the bearing modules 11 of the first frame 10 and of the second frame 10' are in the bearing portion 110 engaged configuration, so that the first pair 120 and the second pair 121 of linear actuators remain aligned with the longitudinal axis of the conduit 2. Thus, the risk of the frame 10 hitting the wall 20 of the conduit 2 is limited or even completely prevented. According to this example, the rotational motion of the base plate 100 of the first frame 10 and that of the base plate 100' of the second frame 10' can be simultaneous.

According to the example shown in FIG. 2, each base plate 100, 100' can comprise a first circular portion 1000, 1000' and a second circular portion 1001, 1001', mounted integrally and preferably juxtaposed. The linear actuators of the first pair 120 and of the second pair 121 can be mounted on the second portion 1001, 1001' of each base plate 100, 100'. For the first frame 10, the first circular portion 1000 can be driven such that it rotates about the longitudinal axis of the first frame 10 through the angular range. For the second frame 10', the first circular portion 1000' can be driven such that it rotates about the longitudinal axis of the first frame 10' through the angular range. For example, the first frame 10 and the second frame 10' can each comprise a motor, not shown in the figures, such that each first circular portion 1000, 1000' is driven by this motor.

The first pair 120 can be disposed in a first plane P1 and the second pair 121 can be disposed in a second plane P2, the first plane P1 being different from the second plane P2. Thus, the extendibility of at least one linear actuator of the first pair 120 and of at least one linear actuator of the second pair 130, as well as the angular sector of rotational freedom of these actuators relative to the first frame 10 and to the second frame 10', allows a three-dimensional space to be defined, in which space the first frame 10 can be positioned. This space can be defined as a cone with an ellipsoidal cross-section, with the generator parallel to the longitudinal axis of the robot and the apex being a point at the intersection between the first plane P1 and the second plane P2. The relative mobility of the first frame 10 and of the second frame 10' is thus improved.

Figure 6:
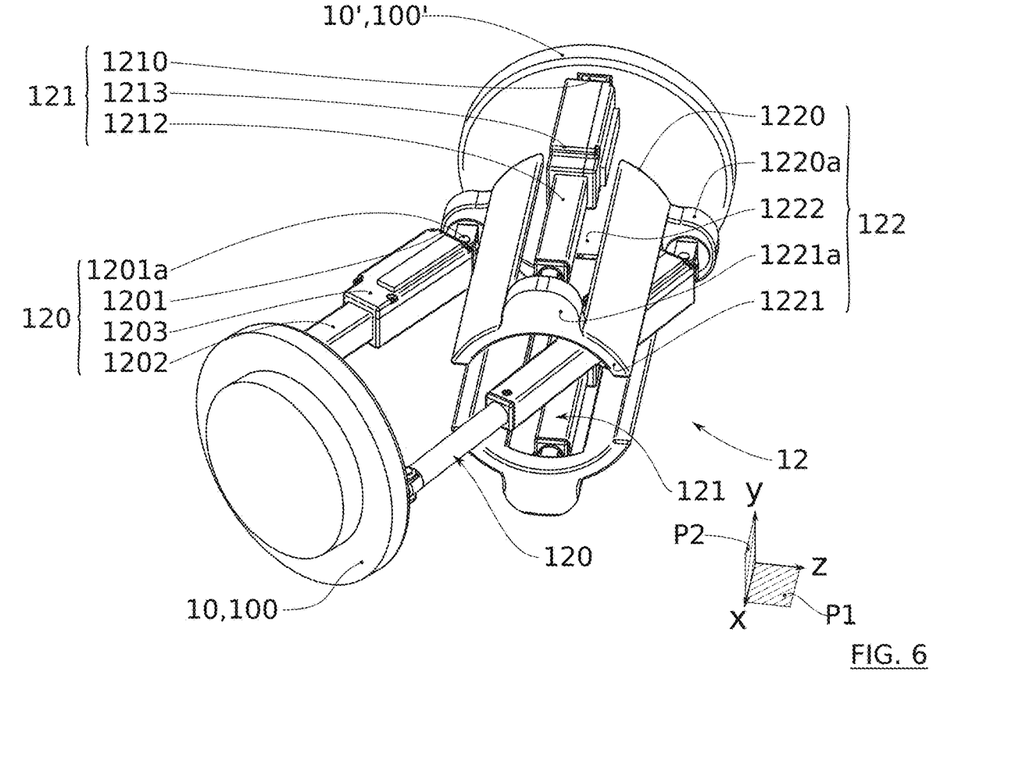
FIG. 6 shows a perspective, assembled view of the part of the robot in the configuration shown in FIG. 5.

In order to further improve the relative mobility of the first frame 10 and of the second frame 10', the planes P1 and P2 can be perpendicular, as shown in FIGS. 3 and 6. The space in which the first frame 10 can be oriented is thus maximised in all directions perpendicular to the longitudinal axis of the robot. This space can thus be defined as a cone with a circular cross-section, with the generator parallel to the longitudinal axis of the robot and the apex being a point at the intersection between the first plane P1 and the second plane P2. For example, the first frame 10 can be positioned in an axisymmetric cone with an apex angle of substantially 60° to the longitudinal axis x' of the second frame 10'.

The positioning system 12 can further comprise an intermediate mounting 122. The intermediate mounting 122 is configured to at least partially exploit the extendibility of at least one linear actuator of each of the first pair 120 and the second pair 121, in order to increase the space in which the first frame 10 can be positioned. For this purpose, the first pair 120 and the second pair 121 of linear actuators can be mounted on the mounting 122 such that they are disposed on either side of the mounting 122, in a direction parallel to the longitudinal axis x of the robot 1. Moreover, the first pair 120 and the second pair 121 of linear actuators can be mounted on the mounting 122, so as to be free to rotate through at least one angular sector relative to the mounting 122, about an axis perpendicular to the longitudinal axis x of the robot 1.

Figure 7:
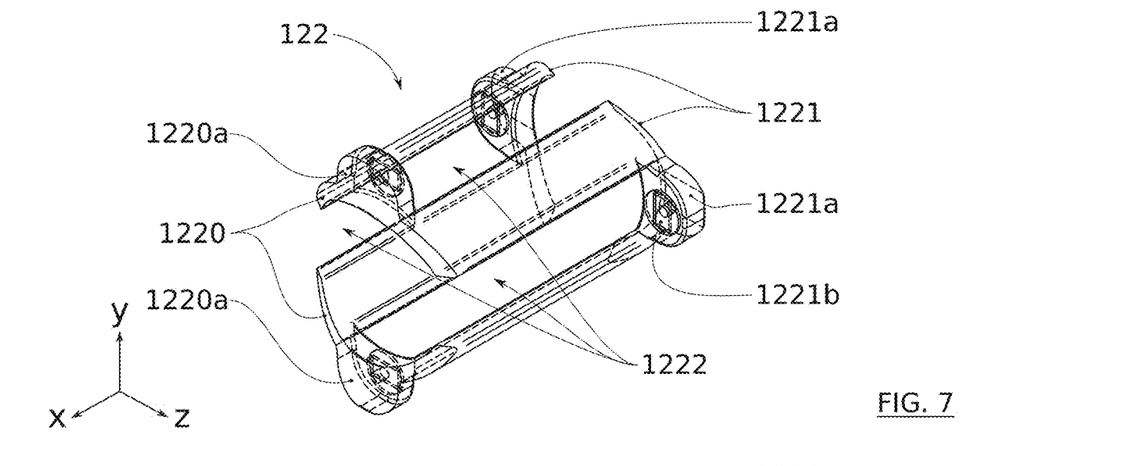
FIG. 7 shows a perspective view of an intermediate mounting of the robot shown in FIG. 1.
Figure 8:
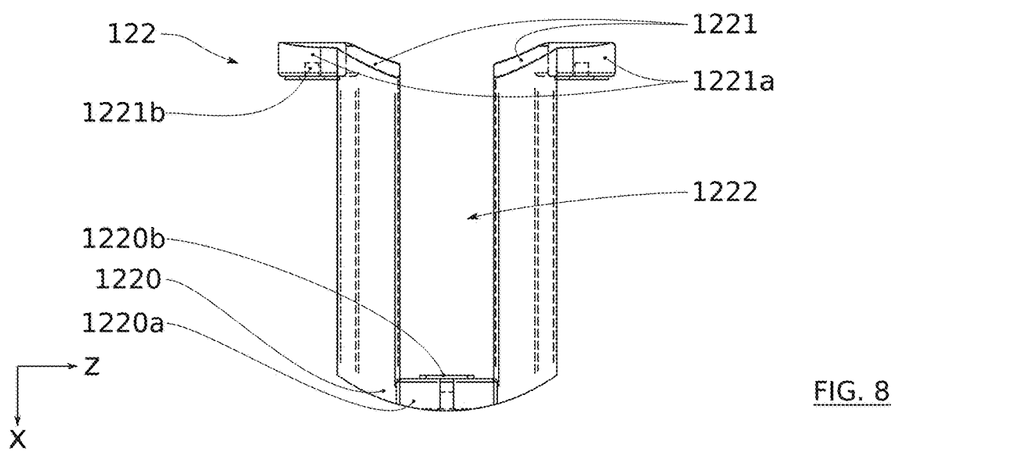
FIG. 8 shows an overhead view of the intermediate mounting shown in FIG. 7.
Figure 9:
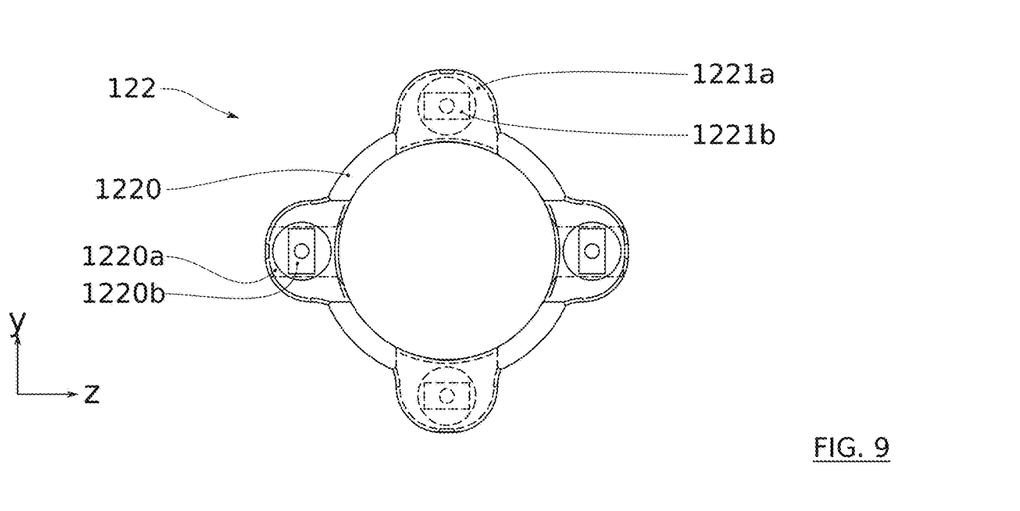
FIG. 9 shows a view along the longitudinal axis of the robot shown in FIG. 1, of the intermediate mounting shown in FIG. 7.

The mounting 122 will now be described in detail with reference to FIGS. 3 to 9. The mounting 122 can be disposed between the first frame 10 and the second frame 10', the longitudinal axis whereof can be parallel to the longitudinal axes x and x' of the first frame 10 and of the second frame 10', when the first frame 10 and the second frame 10' are aligned. The mounting 122 can be generally cylindrical in shape, as shown in FIGS. 7 to 9. The mounting comprises a first base 1220 and a second base 1221. The first pair 120 of linear actuators can be mounted on the first base 1220. The second pair 121 of linear actuators is mounted on the second base 1221, as shown in FIGS. 3 to 6. The length of the mounting 122 between the first and the second base is preferably shorter than the length of a linear actuator.

Moreover, the mounting is configured such that, when the actuators of the first pair 120 and of the second pair 121 are retracted, the length of the positioning system 12 is shorter than the sum of the lengths of the actuators of the first pair 120 and of the second pair 121 when retracted. Thus, the volume of the positioning system 12, along the longitudinal axis x of the robot 1, can be reduced. As a result, the compactness of the robot can be improved. For this purpose, the first base 1220 is disposed facing the second frame 10', and the second base 1221 is disposed facing the first frame 10, when the first frame 10 and the second frame are aligned, as shown in FIG. 3.

The first base 1220 and the second base 1221 each comprise reliefs 1220a, 1221a which form lateral extensions. According to the example shown in FIGS. 7 to 9, these reliefs 1220a, 1221a are disposed in the plane of respectively the first base 1220 and the second base 1221. These reliefs 1220a, 1221a further comprise connecting elements 1220b, 1221b, to which the articulated joints 1201a of the first pair 120 of linear actuators and the articulated joints 1211a of the second pair 121 of linear actuators can be mounted.

The mounting 122 can comprise apertures 1222 configured to allow for the passage of each linear actuator of the first pair 120 and of the second pair 121, upon rotational motion of these actuators relative to the mounting 122. For example, the mounting comprises two pairs of apertures 1222, a first pair of apertures 1222 being located in the plane of the first pair 120 of linear actuators, and the second pair of apertures 1222 being located in the plane of the second pair 121 of linear actuators, as shown in FIG. 6. As shown in FIGS. 7 and 8, the first pair of apertures 1222 can extend from the relief 1221a of the second base 1221 through the first base 1220. The second pair of apertures 1222 can extend from the relief 1220a of the first base 1220 through the second base 1221.

The robot 1 can further comprise a measuring device suitable for measuring the orientation of the conduit 2. This measuring device can be carried by at least one of either the first frame 10 or the second frame 10'. The mapping of the conduit 2 can thus be measured by the robot 1. The robot 1 can further record the route taken, in particular in order to return to its point of insertion into the conduit 2. For example, the measuring device can enable the relative actuations of the first pair 120 and the second pair 121 of actuators to be measured. According to another example, the measuring device can comprise distance sensors suitable for measuring the distance between the robot and the wall 20 of the conduit 2, at several points on the robot.

The robot 1 can comprise a controller configured to independently actuate each linear actuator of the first pair 120 and of the second pair 121, in addition to a power source. Thus, the robot 1 can be displaced autonomously. The robot 1 thus does not need to be steered remotely in order to explore the pipes. Moreover, there is no need for a remote connection to the robot. In particular, the controller can communicate with the measuring device so as to position the first frame 10 according to the orientation of the conduit, as measured by the measuring device. According to one example, the controller is a PID controller.

It is clear from the above description that the invention provides a solution for improving the mobility of a conduit-exploring robot 1, and in particular for improving the relative mobility of the first frame 10 and the second frame 10'. Furthermore, this mobility allows the displacement of the robot 1 to be adapted to the configuration of the conduit 2, which can in particular lead to the efficient exploration of the conduit.

The invention is not limited to the aforementioned embodiments, and includes all the embodiments covered by the claims.

It is in particular possible for the robot to comprise more than two frames, which can optionally be connected, for example in pairs, by a positioning system. It is furthermore possible for a positioning system to comprise more than two pairs of linear actuators. For example, at least one positioning system can comprise three pairs of linear actuators. It is furthermore possible for the positioning system to comprise at least one additional intermediate mounting, wherein the intermediate mountings follow on from one another between the first frame and the second frame, wherein the connections between the intermediate mountings can be formed by additional pairs of actuators.

Furthermore, the articulated joints of the actuators can have more than one degree of rotational freedom relative to at least one of the frames. At least one articulated joint can be a ball joint for example.

According to one example, the first pair of linear actuators 120 can be disposed in a first plane P1 and the second pair of linear actuators 121 can be disposed in a second plane P2, the first plane P1 being parallel, or coincident with the second plane P2. Synergistically with the intermediate mounting 122 described hereinabove, the relative orientation amplitude of the first frame 10 and of the second frame 10', in a plane parallel or coincident with the planes P1 and P2, can be increased compared to two pairs of actuators disposed in two different planes. In particular, this amplitude can be doubled. Moreover, the rigidity of the positioning system 12 is improved. Synergistically with the base plate 100, 100' described hereinabove, the first frame 10 and the second frame 10' can be oriented relatively in three dimensions by revolution about the axis of rotation of the base plate 100, 110'.

LIST OF REFERENCES

1. Robot
10. First frame
10'. Second frame
100, 100'. Base plate
1000, 1000'. First portion
1001, 1001'. Second portion
11. Bearing module
110. Bearing portion
111. Arm
12. Positioning system
120. First pair of linear actuators
1200. First end
1200a. Articulated joint
1201. Second end
1201a. Articulated joint
1202. Body
1203. Motor block
1204. Sliding projection
121. Second pair of linear actuators
1210. First end
1210a. Articulated joint
1211. Second end
1211a. Articulated joint
1212. Fixed block
1213. Motor block
1214. Sliding projection
122. Intermediate mounting
1220. First base
1220a. Relief
1220b. Fastening element
1221. Second base
1221a. Relief
1221b. Fastening element
1222. Aperture
2. Pipe
20. Wall

The invention claimed is:

1. A robot for exploring a conduit, the robot comprising:
a first frame and a second frame, the first frame and the second frame each comprising a bearing module, the bearing module being provided with a bearing portion that can be applied against a wall of the conduit, each bearing module being configured to move alternately from a bearing portion engaged configuration to a bearing portion disengaged configuration;
at least one system for a relative positioning of the first frame and the second frame, the positioning system connecting the first frame and the second frame;
wherein the positioning system comprises at least a first pair of linear actuators, which are disposed in a direction parallel to a longitudinal axis (x) of the robot, said axis passing through a centre of the first frame and a centre of the second frame, when the first frame and the second frame are aligned, able to be independently actuated so that to move in translation along a longitudinal axis of each linear actuator of the first pair, and configured to be free to rotate, through at least one angular sector, relative to at least one of either the first frame or the second frame, about an axis perpendicular to the longitudinal axis (x) of the robot, so as to position the first frame and the second frame relative to one another, and
wherein the positioning system comprises a second pair of linear actuators, disposed in a direction parallel to the longitudinal axis (x) of the robot, able to be independently actuated so that to move in translation along a longitudinal axis of each linear actuator of the second pair, and configured to be free to rotate, through at least one angular sector, relative to at least one of either the first frame or the second frame, about an axis perpendicular to the longitudinal axis (x) of the robot.

2. The robot according to claim 1, wherein the positioning system is configured at least so as to position one of either the first frame or the second frame, one of either the first frame or the second frame being in the bearing portion disengaged configuration, relative to the other of either the first frame or the second frame, the other of either the first frame or the second frame being in the bearing portion engaged configuration.

3. The robot according to claim 1, wherein each linear actuator of said first pair is free to rotate, through at least one angular sector, relative to the first frame and to the second frame, in at least one direction perpendicular to the longitudinal axis (x) of the robot.

4. The robot according to claim 1, wherein at least one of either the first frame or the second frame comprises a base plate, the first pair of actuators being connected to at least one of either the first frame or the second frame via the base plate.

5. The robot according to claim 4, wherein the base plate is configured to be capable of moving via a rotational motion about an axis parallel to the longitudinal axis (x) of the robot, through at least one angular range.

6. The robot according to claim 1, wherein the first pair of linear actuators is disposed in a first plane and the second pair of linear actuators is disposed in a second plane, the first plane being different from the second plane.

7. The robot according to claim 6, wherein the first plane and the second plane are perpendicular.

8. The robot according to claim 1, wherein the positioning system further comprises an intermediate mounting, the first pair of linear actuators being mounted on the first frame via a first portion, the second pair of linear actuators being mounted on the second frame via a first portion, the first pair and the second pair of linear actuators each being mounted on the intermediate mounting by a second portion, such that the first pair and the second pair of linear actuators are disposed on either side of the intermediate mounting in a direction parallel to the longitudinal axis (x) of the robot.

9. The robot according to claim 8, wherein the intermediate mounting comprises a first base and a second base, the first pair of linear actuators being mounted on the first base and the second pair of linear actuators being mounted on the second base, the intermediate mounting being configured such that the length of the positioning system along the longitudinal axis (x) of the robot is shorter than the sum of the lengths of at least one actuator of the first pair and of at least one actuator of the second pair.

10. The robot according to claim 8, wherein at least one of either the first pair or the second pair of linear actuators is mounted on the intermediate mounting, so as to be free to rotate through at least one angular sector relative to the intermediate mounting, about an axis perpendicular to the longitudinal axis (x) of the robot.

11. The robot according to claim 10, wherein the intermediate mounting is configured such that at least one of either the first pair or the second pair of linear actuators is free to rotate, through the at least one angular sector, relative to the intermediate mounting.

12. The robot according to claim 11, wherein the intermediate mounting comprises a plurality of apertures configured so as to allow for the passage of each linear actuator of at least one of either the first pair or the second pair, during a rotational motion, through the at least one angular sector, relative to the intermediate mounting, about the axis perpendicular to the longitudinal axis (x) of the robot.

13. The robot according to claim 1, wherein the robot further comprises a measuring device suitable for measuring an orientation of the conduit.

14. The robot according to claim 1, wherein the robot further comprises a controller configured to independently actuate each linear actuator of the at least one first pair.

15. A robot for exploring a conduit, the robot comprising:
a first frame and a second frame, the first frame and the second frame each comprising a bearing module, the bearing module having a bearing portion configured to be applied against a wall of the conduit, each bearing module being configured to move alternately from a bearing portion engaged configuration to a bearing portion disengaged configuration;
at least one system for a relative positioning of the first frame and the second frame, the positioning system connecting the first frame and the second frame;
wherein the positioning system comprises at least a first pair of linear actuators, which are disposed in a direction parallel to a longitudinal axis (x) of the robot, said axis passing through a centre of the first frame and a centre of the second frame, when the first frame and the second frame are aligned, able to be independently actuated so that to move in translation along a longitudinal axis of each linear actuator of the first pair, and configured to be free to rotate, through at least one angular sector, relative to at least one of either the first frame or the second frame, about an axis perpendicular to the longitudinal axis (x) of the robot, to position the first frame and the second frame relative to one another, and
wherein at least one of either the first frame or the second frame comprises a base plate, the first pair of actuators being connected to at least one of either the first frame or the second frame via the base plate, and
wherein the base plate is configured to be capable of moving via a rotational motion about an axis parallel to the longitudinal axis (x) of the robot, through at least one angular range.

* * * * *